Jan. 10, 1967   W. C. CAMPBELL   3,297,841
ELECTRIC TENSION SWITCH ASSEMBLY
Original Filed Feb. 19, 1963
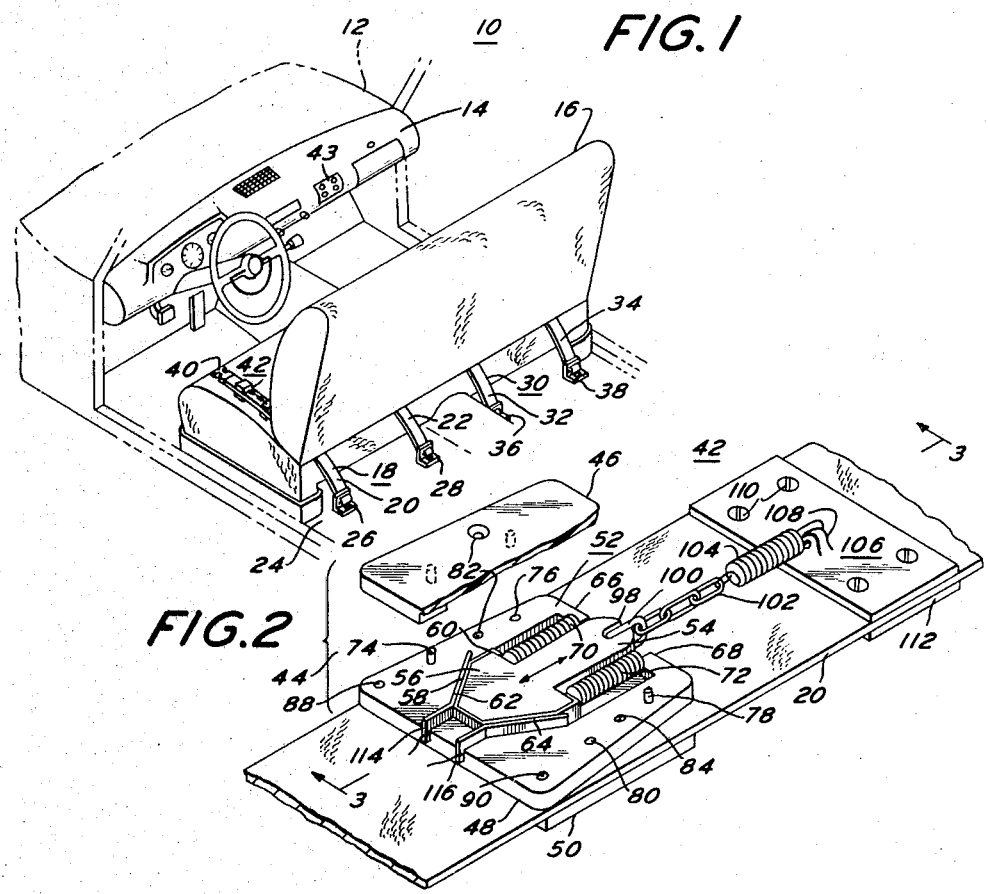
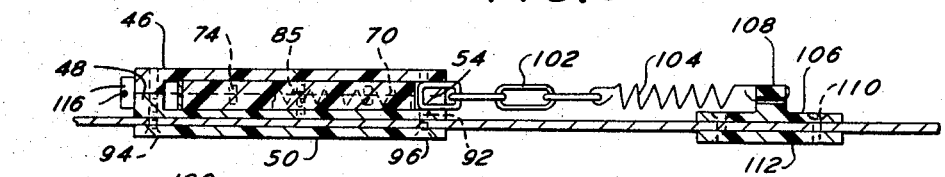
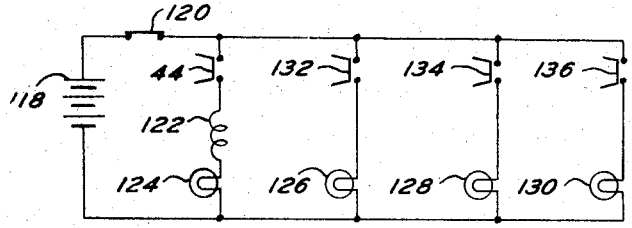
INVENTOR.
WILLIAM C. CAMPBELL
BY
ATTORNEY United States Patent Office 3,297,841
Patented Jan. 10, 1967

3,297,841
ELECTRIC TENSION SWITCH ASSEMBLY
William C. Campbell, Levittown, Pa. (% Carlson's Alinement Service, 2nd St. and Roosevelt Blvd., Philadelphia, Pa. 19120)
Original application Feb. 19, 1963, Ser. No. 259,673. Divided and this application Apr. 8, 1965, Ser. No. 446,492
4 Claims. (Cl. 200—61.58)

This invention relates to electric switches, and more particularly, to an improved tension switch for sensing tension on a seat belt or the like.

This is a divisional application of the subject matter originally contained in my copending application Serial No. 259,673, filed February 19, 1963, now abandoned.

Automobile seat belts are fast gaining acceptance by the public as important and necessary safety devices. Seat belts have little value, however, if they are not fastened or if they are improperly fastened. Therefore, a warning signal, such as a light on a dashboard, is required to indicate when a seat belt is improperly utilized. A most satisfactory warning may be transmitted by the seat belt tension, as described in detail in the aforementioned copending application. It is desirable, therefore, to have a tension switch which is compact and available for placement anywhere on the seat belt. If the tension switch is to be worn with the belt on the passenger, it must be lightweight and must not interfere with the passenger's comfort. Most important of all, since it is a safety device, it must be self-cleaning, non-jamming, able to stand hard knocks, and of utmost simplicity. In short, it must be operational at all times.

Therefore, to overcome the foregoing and other difficulties of the prior art, the general object of this invention is to provide a new and improved tension switch.

Another object of this invention is the provision of a better tension switch which is non-jamming and self-cleaning in operation.

Another object of this invention is the provision of a new and improved tension switch which is easy to mount on an automobile seat and of utmost dependable and simple operation.

A further object is to provide an improved tension switch which is economical to produce and which utilizes conventional, currently available components that lend themselves to standard mass production manufacturing techniques.

Other objects will appear hereinafter.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following descriptions and claims taken in conjunction with the accompanying drawings in which:

FIGURE 1 is a perspective view of an automobile interior and seat belts therein which incorporate the tension switch of the present invention.

FIGURE 2 is a partially exploded perspective view of the improved tension switch mounted on a seat belt.

FIGURE 3 is a cross-sectional view of the switch of FIGURE 2 taken along lines 3—3.

FIGURE 4 is a schematic diagram of an electrical circuit utilizing the improved tension switch.

Referring to the drawings in detail, wherein like numerals indicate like elements, there is shown in FIGURES 2 and 3, detailed drawings of the improved tension switch of the present invention designated generally as 42. The tension sensing device 42 consists of a tension switch 44 formed of two molded plastic parts 46 and 48. The parts 46 and 48 are identical and adapted to be mated together to form the housing of the switch 44. As shown in the drawings, the switch may be mounted on a seat belt web 20 by placing a switch securement plate 50 below the web for securing of the switch 44 thereon.

The molded parts 46 and 48 each have a centrally located cavity 52 therein for receiving and reciprocating armature 54 also manufactured of a non-conductive insulating material such as plastic. The armature 54 has an enlarged arrow-shaped head portion 56 which has secured on the face thereof a conducting strip 58. The conducting strip 58 has crimped-over end portions 60 which secure it fixedly on the face of the arrow-shaped portion 56. Two discrete wall portions of the cavity 52 have placed thereon suitable conductors 62 and 64 for providing separate electrical contacts with the conducting strip 58. It should be noted that the angular disposition of the contacts 62 and 64 with respect to the conductor 58 provide good contact cleaning of these elements. Further, the angular disposition provides a limit stop for the armature 54.

Notice that the molded parts 46 and 48 and armature 54 are flat to provide an assembly, shown in FIGURE 3, which is compact. The switch assembly shown is no thicker than a belt buckle and may be comfortably worn on a belt such as the seat belt web 20 shown.

A cavity 52 of the molded parts 46 and 48 additionally has back wall portions 66 and 68 for receiving one end of compression springs 70 and 72 placed between the back walls 66 and 68 and the back of the arrow-shaped head 56 of the armature 54. These springs 70 and 72 assure normal closed contact between the conductor 58 and the conducting strips 62 and 64 so that there is a completed circuit between the conductors 62 and 64 in the unstressed condition of the switch 44. The back wall portions 66 and 68 have a space therebetween to allow guided reciprocal movement of the armature 54.

The molded parts 46 and 48 are locked in place one against the other by the provision of oppositely-disposed pins 74 and 78 and oppositely-disposed recesses 76 and 80 alongside edges of the molded parts. When the two molded parts 46 and 48 are placed one against the other, the pins 74 and 78 fit into respective recesses 76 and 80 on the opposite molded part. Additionally, rivet holes 82 and 84 are provided in the molded parts 46 and 48 for receiving rivets 85 for holding the two parts 46 and 48 together in sealing arrangement. Thus, the molded plastic pins 74 and 78 cooperating with the recesses 76 and 80 align the two molded parts 46 and 48 while the rivets 85 mold the two parts in place so as to achieve a simple and easy method of manufacturing the tension switch of the present invention while providing a clean, compact and simple unit.

In addition to the rivet holes 82 and 84, there are provided pairs of screw receiving holes 88 and 90 along one side of the switch 44 for receiving bolts 94 passing through the plate 50 and the web 20 to hold the switch 44 in place on a seat belt web 20 or the like. Further, a hole 92 is additionally provided adjacent the armature 54 with a recess for receiving a blind nut which is adapted to cooperate with a bolt 96 passing through the plate 50 to hold the front portions of the switch 44 in place. The seat belt web 20, or the like, may be manufactured of a woven material and can easily be pierced by the screws without the necesssity of providing special holes therethrough. Furthermore, the provision of the plates 50 eliminates any stresses that would otherwise occur on the web 20 where the plates 50 are provided.

The armature 54 has a link receiving recess 98 on the end thereof opposite from the arrow-shaped head 56. The link receiving recess 98 is adapted to cooperate with a link 100 so that the armature 54 can reciprocate within the housing without jamming of the armature due to friction between the link 100 and the housing parts 46 and 48. The link 100 is adapted to be secured to a link chain 102. The link chain 102 is attached through a coil spring 104 to a web securement plate 106 with a suitable spring receiving opening 108 thereon. Web plate 106 is attached to the belt web 20 by screws 110 engaging a back-up plate 112 on the side of the web opposite from the web plate 106.

The link chain 102 eliminates the web belt 20 as a consideration in determining the tension between the plate 106 and the switch 44. The link chain 102, in addition to providing a rigid connector between these two last-mentioned members, is flexible enough to follow the various contours of a person around which the seat belt 18 is secured.

The coil spring 104 prevents excessive tension from being applied to the switch 44. The spring 104 is far heavier than springs 70 and 72 in the switch. Therefore, when the web 20 is first tensioned, the springs 70 and 72 are compressed to break the circuit between contacts 62 and 64. If the unit is further tensioned beyond the end point of springs 70 and 72, spring 104 will take up the excess tension so as not to put excessive pressure on the back walls 66 and 68 of the switch 44. Spring 104 prevents closing of the switch 44 during normal body movement of the passenger with respect to the seat belt 18.

The movement of armature 54 cleans the contacts 62 and 64 so that intimate electrical contact is always assured. Further, the contacts 62 and 64 extend out of the molded parts 46 and 48 and are held in place by nubs 114 and 116 respectively. The combination of the nubs 114 and 116 and the angled portion of the contacts which engage the arrow-shaped head 56 of the armature 54 assures the mechanical placement of the contacts within the switch housing. Suitable connectors are adaptable to be placed over the nubbed ends 114 and 116 to connect the switch 44 into an electrical circuit, for instance, that shown in FIGURE 4.

In FIGURE 4, the switch 44 is shown in a circuit supplied with power by the battery 118 of the automobile 12 in series with the ignition switch 120. Switch 44 is a parallel circuit supplying electrical energy by the battery 118. In series with the switch 44 is a winding 122 of a suitable audible signal, such as a bell and a light bulb 124. Thus, when the ignition 120 is turned on and when switch 44 has its contacts closed, the bell 22 and light 24 will be energized by the battery 118. All that is necessary to prevent this energization is for the driver of the automobile to properly secure the straps 20 and 22 around his girth so as to tension the switch 44 and thereby break the circuit to the bell 122 and the light bulb 124. The audible signal is only provided with a driver's seat belt as it is most important that he be told when his seat belt is improperly secured. The bell 124 is part of the display panel 43 on the dashboard 14 of FIGURE 1.

There are also provided, as shown in FIGURE 4, three additional light bulbs 126, 128 and 130 positioned on the display panel 43 and associated in respect to parallel circuits with tension switches 132, 134 and 136 for three other seat belts in the automobile. Thus, from the driver's seat, he can determine by a simple look at the panel 43 which of the occupants of the car have their seat belts properly secured. Further, if a particular seat belt is not being utilized because there are no passengers in the car, the display panel 43 does not provide a distraction to the driver such as would if bells or other audible devices were utilized with the passenger seat belt tension switches 132, 134 and 136.

Additionally, by turning on the switch 120, the driver can automatically determine whether the seat belt sentinel is operating by looking at panel 43. If all lights are off, all of the warning devices are in operation and no other check is necessary.

The present improved tension switch may be utilized on seat belts for buses, airplanes, or other means of transportation wherein seat belts might be provided.

The present invention may be embodied in other specific forms without departing from the spirit or essential attributes thereof and, accordingly, reference should be made to the appended claims, rather than to the foregoing specification as indicating the scope of the invention.

I claim:

1. A seat belt switch comprising a tension switch including a pair of molded parts, one of said molded parts having a recess therein adapted to cooperate with the other of said molded parts recess to form a switch cavity, an armature adapted for reciprocal movement in said switch cavity, said armature having an enlarged arrow-shaped head portion, a first electrically conducting strip secured about the face of said arrow-shaped head portion, second and third electrically conducting strips extending from the walls of said switch cavity cooperating with said arrow-shaped head portion to a point outside of said molded parts, said second and third electrically conducting strips being electrically insulated and spaced one from another, compression spring biasing means mounted behind said arrow-shaped head portion to bias said first conducting strip into electrical contact with said second and third conducting strips, a connector for transmitting tension in a seat belt to said tension switch, said connector including a flexible linkage connected to said armature, a web connector for fixing said linkage to a belt at a position beyond said linkage, a tension spring connecting said linkage to said web connector, said tension spring being heavier than said compression spring biasing means whereby said tension spring is operative only after the operation of said compression spring biasing means.

2. The tension switch of claim 1 wherein one of said molded parts includes pins and the remaining molded part includes recesses therein, said pins on said one molded part cooperating with the recesses on the other molded part to align the switch and form said switch cavity.

3. The tension switch of claim 1 wherein said molded parts and armature are of a flat configuration for assembly into a compact tension switch having a thin profile.

4. The tension switch of claim 1 wherein said arrow-shaped head portion has a blunt tip carrying a portion of said first electrically conducting strip to provide a conductive path between said second and third electrically conducting strips whenever biased into electrical contact by said biasing means.

References Cited by the Examiner

UNITED STATES PATENTS

| | | | |
|---|---|---|---|
| 2,639,341 | 5/1953 | Traux | 200—165 X |
| 2,659,791 | 11/1953 | Dickinson | 200—161 |
| 3,221,131 | 11/1965 | Bury | 200—168 |
| 3,226,674 | 12/1965 | Eriksson. | |

FOREIGN PATENTS 182,925  7/1922  Great Britain.

BERNARD A. GILHEANY, *Primary Examiner.*

J. BAKER, *Assistant Examiner.*